Oct. 28, 1958     H. J. SCHWERDHOFER     2,857,676
GEAR SETTING GAUGE FOR BICYCLES

Filed March 9, 1956     2 Sheets-Sheet 1

INVENTOR
Hans Joachim Schwerdhöfer

By Richardson Davis and Norton
his ATTORNEYS.

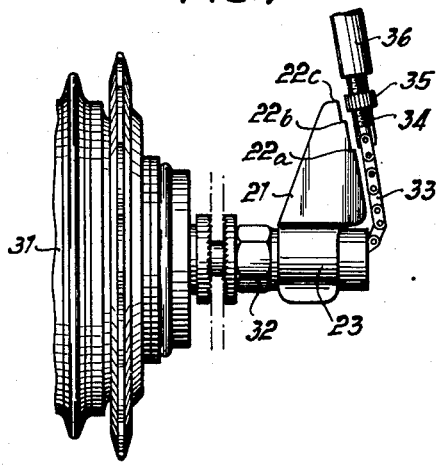
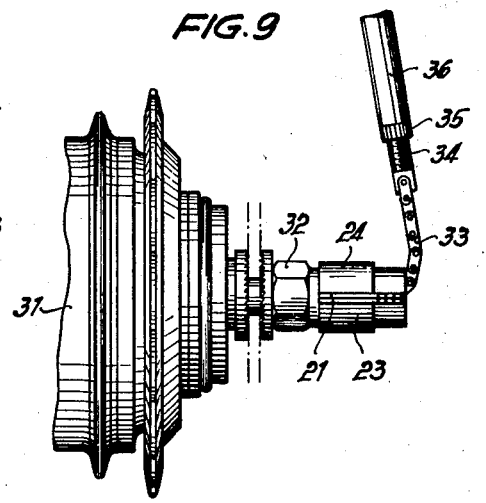
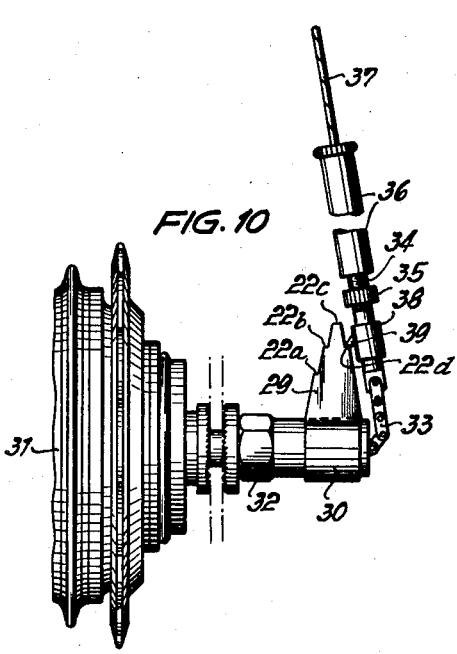
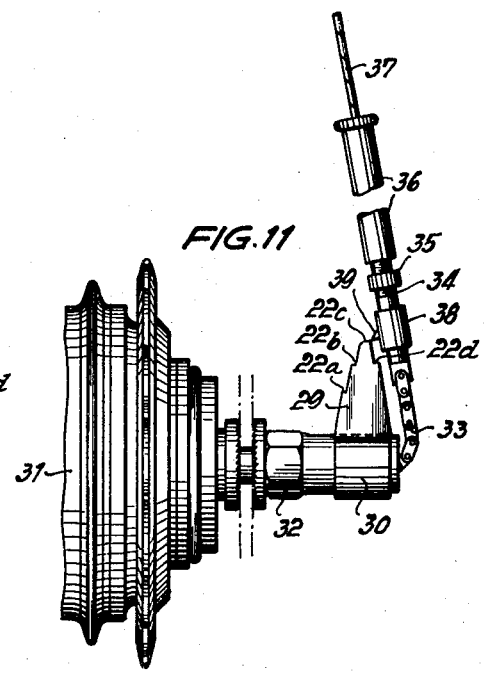

United States Patent Office 2,857,676
Patented Oct. 28, 1958

2,857,676

GEAR SETTING GAUGE FOR BICYCLES

Hans Joachim Schwerdhofer, Schweinfurt, Germany, assignor to Firma Fichtel & Sachs A. G., Schweinfurt (Main), Germany, a corporation of Germany Application March 9, 1956, Serial No. 570,613

Claims priority, application Germany March 11, 1955

1 Claim. (Cl. 33—180)

The present invention relates to novel means for adjusting the gear shift mechanism of bicycles and other devices equipped with multi-speed hubs. More particularly, it relates to a novel gauge which may be employed together with novel indicating means in adjusting the gear shift mechanism to correctly designate the gear ratio of the multi-speed hub.

Bicycles and other similar vehicles are often equipped with multi-speed or multi-gear transmissions so that the gear ratio may be varied in dependence upon the travelling conditions, e. g., for starting, for speed, for climbing long hills, and the like. The hub of the rear wheel is generally provided with the transmission and houses the plural gears. A chain or cable connection extends from the hub to a dial at the handlebar where several gear ratios are indicated. By moving a gear shift lever at the handlebar to a particular position, the chain is either paid out or pulled up so that a control element connected to the chain moves within the hub and produces a change in the gear ratio. For proper functioning of the transmission within the hub, however, it is essential that the individual gear engagement positions be properly indicated, i. e., that the positions indicated for the gear ratios on the dial at the handlebar actually correspond to the several gear adjustments within the hub. Failure to effect correct setting will lead to operational disturbances and injury to the drive parts and the gearing.

The end of the chain or cable which extends to the transmission hub is provided with a small pull rod extending through an annular chain guide nut into the hollow axle of the hub. Heretofore, to check or adjust the transmission ratios the chain guide nut was provided with a small recess and the pull rod was provided with markings corresponding to the individual transmission ratios. The disposition of a particular marking relative to the recess afforded the desired information.

This manner of adjustment is disadvantageous in several respects. First, with the passage of time the recess of the chain guide nut and the markings of the pull rod become dirty so that they must be cleaned before a reading can be made. Second, the markings on the pull rod must be produced with extreme accuracy if exact adjustment is desired and this increases the cost of manufacture. Another important disadvantage resides in the fact that in tightening the chain guide nut the recess will of course be carried around and it is not possible to ensure that ultimately the recess will be directed upwardly where it is readily visible. Should it be directed downwardly it is necessary to lie on the ground or to elevate the bicycle to determine the relative positions of the pull rod markings with respect to the recess.

It is accordingly an object of the present invention to provide a novel means which facilitates adjustment of the transmission ratios of multi-speed hubs such as are found in bicycles.

Another object of the invention is to provide a novel gauge which can be removably positioned on the chain guide nut to check or adjust the transmission ratios.

A further object of the invention is to provide a novel gauge for the purpose indicated which may be manufactured inexpensively and which may be employed without particular mechanical skill and without difficulty or inconvenience such as attends the devices previously employed.

These and other objects and advantages are realized in accordance with the present invention which will be described with reference to the accompanying drawings wherein.

Figure 1:
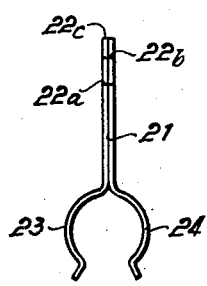
Fig. 1 is an end elevation of a novel gauge in accordance with the present invention.
Figure 4:
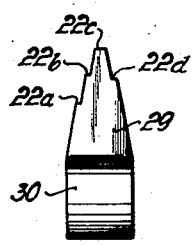
Fig. 4 is a side elevation of a further embodiment provided with measuring surfaces on two edges.

Figs. 6 to 9, inclusive, are elevations of a portion of a bicycle hub with a chain extending into the chain guide nut and with the gauge of Fig. 1 positioned on the chain guide nut with the adjustment means shown in four successive positions, respectively;

Fig. 10 is an elevation of a bicycle hub carrying the gauge of Fig. 4, the cable being provided with a different type of indicator positioned to one gear setting; and Fig. 11 is a view similar to Fig. 10 in an intermediate position prior to checking of the second gear setting.

Figure 2:
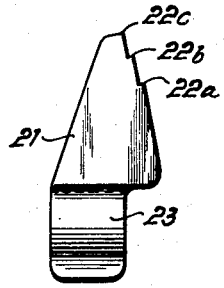
Fig. 2 is a side elevation of the gauge of Fig. 1.

Referring now more particularly to the drawings, the gauge of Figs. 1 and 2 comprises a flat roughly triangular, two-ply body 21 provided on one edge with step-like measuring surfaces 22a, 22b and 22c. At its base, the body 21 is integral with a pair of spring members 23, 24 which together form a curved bracket for affixing the gauge to the chain guide nut of a bicycle as hereinafter described with reference to Fig. 6.

Figure 3:
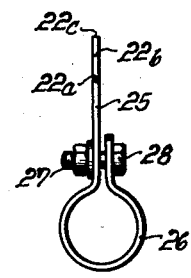
Fig. 3 is an end elevation of a modified gauge provided with a screw clamp.

The gauge of Fig. 3 includes a single-ply, flat body portion 25 provided with measuring surfaces 22a, 22b and 22c. At its bottom, the body 25 is provided with a mounting portion 26 defining substantially a cylindrical surface and a threaded bolt 27 extends through apertures provided in body 25 and circular portion 26. Nut 28 on bolt 27 serves to lock the gauge on to the chain guide nut (not shown) of the transmission hubs.

Figure 5:
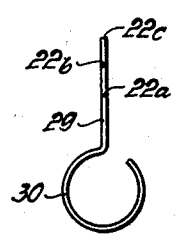
Fig. 5 is an end elevation of the gauge of Fig. 4.

In Figs. 4 and 5, the lower end of the single-ply body 29 of the gauge is deformed into a substantially circular portion 30 adapted to surround a chain guide nut as shown in Fig. 10. The body is provided on one edge with measuring surfaces 22a, 22b and 22c whereas the other edge is also provided with a measuring surface 22d. In this manner the same gauge can be used with different hubs, one measuring edge being designed for one type of hub and the other edge being designed for another type of hub.

Figs. 6 to 9 show the bicycle hub designated generally as 31 with the chain guide nut 32 projecting to the right. The chain 33 extends into the hollow of nut 32 and is fastened at its upper end to a threaded pin 34. The threads of pin 34 lie approximately alongside the edge of the gauge body 21 provided with measuring surfaces 22a, 22b and 22c for a purpose hereinafter described. A knurled nut 35 threadedly engages pin 34 and the upper end of the pin 34 extends into an internally threaded turnbuckle sleeve 36, the turnbuckle sleeve 36 being connected to a Bowden cable 37 which extends to the handlebar of the bicycle. The Bowden cable 37 terminates in conventional manner in the manual gear shift means (not shown) adjacent a gear selecting dial, Such gear transmission is shown for example in United States Letters Patent Number 2,731,857.

Figure 6:
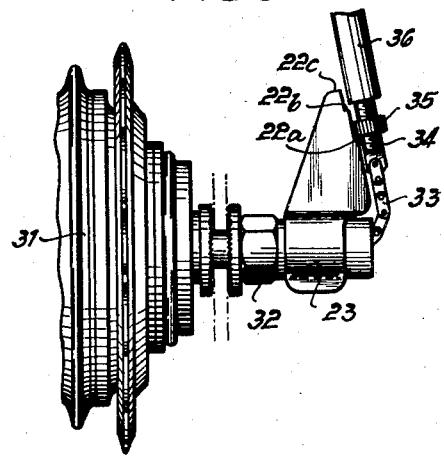

In setting or checking the gear transmission mechanism, the manual lever is initially set into the position marked for high gear and by moving the bicycle pedals (not shown) backwards and forward the high gear is engaged within the hub 31. The turnbuckle sleeve 36 is then partially unscrewed from pin 34 to slacken the Bowden cable 37 leading from the sleeve 36 to the manual gear shift lever (not shown). The gauge is now positioned as shown in Fig. 6. Thereafter, knurled nut 35 is screwed downwardly on pin 34 until its lower face rests on measuring surface 22a as shown in Fig. 6.

Figure 8:
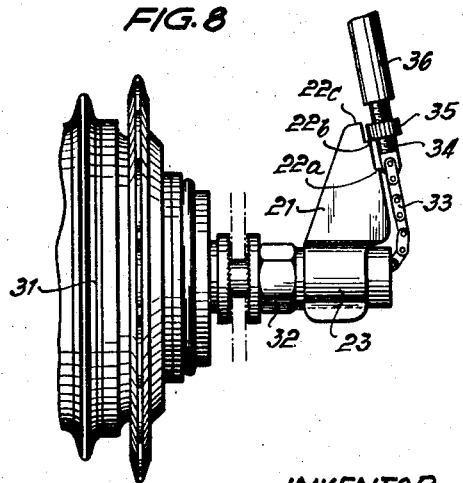

The manual gear shift lever is then moved to the next gear position which raises the sleeve 36 together with nut 35 and pin 34, thereby withdrawing the chain 33 partially from chain guide nut 32 as shown in Fig. 7. The turnbuckle sleeve 36 is then turned on pin 34 until the lower face of nut 35 rests on measuring surface 22b (Fig. 8). The turnbuckle sleeve 36 is then held in position to prevent further displacement relative to pin 34 and nut 35 is threaded up on pin 34 until it rests against sleeve 36 and locks it in position on pin 34 as shown in Fig. 9. The adjustment is now complete and the gauge can be rotated 90° as shown in Fig. 9 so that it will not interfere with operation of the gear shift mechanism or the gauge can be completely removed from the chain guide nut 32.

In the adjustment just described the measuring surfaces 22a and 22b were employed. With certain bicycles the surface 22a may not be readily accessible for the initial step in the operation and the adjustment may therefore be made employing surfaces 22b and 22c.

With the modified mechanism shown in Figs. 10 and 11, the pin 34 is provided with an indicator slide 38 which moves together with the pin 34 but which can be adjusted along an unthreaded portion of the pin. The slide 38 carries an indicator nose 39 which in Fig. 10 projects inwardly above the chain guide nut 32 and rests on measuring surface 22d of the gauge of Fig. 4, corresponding to the high gear position. By moving the manual shift lever (not shown) to the next gear position, the chain 33 is withdrawn, whereupon rotation of the turnbuckle 36 causes the elements to assume the positions shown in Fig. 11 in which the nose 39 rests on the measuring surface 22c. The nut 35 is then turned up to lock turnbuckle 36 in position. It can be seen that in this embodiment the nose 39 performs the indicator function of nut 35 in the embodiment of Figs. 6 to 9, the nut 35 in Figs. 10 and 11 serving only as a lock nut.

With the novel adjusting means the angular disposition of the chain guide nut is immaterial. The gauge when in use is always positioned for easy viewing from the side. Since the setting is based on actual physical contact between a measuring surface and either the lock nut or the nose of the indicator slide, dirt does not limit the accuracy of the adjustment since visibility is not the sole criterion. Adjustments can be made simply without special skill and the gauge can be manufactured inexpensively.

Various changes and modifications can be made without departing from the spirit and scope of the present invention, and it is intended that such obvious changes and modifications be embraced by the annexed claim.

What is claimed is:

A device of the kind described comprising a substantially triangular-shaped body portion composed of two flat sheet metal plates secured together in face-to-face relationship, one end of each of said plates being bowed in opposed relationship and terminating in oppositely disposed slanting edges, one corner and the adjacent side of the triangular-shaped body projecting laterally of the bowed ends, said laterally projecting offset side having a series of stepped shoulders constituting measuring surfaces spaced along its edge, said bowed ends forming a loop-shaped mounting device for mounting the body portion on a cylindrical machine part and said stepped shoulders serving fittingly to engage against a ring-like member for gauging purposes.

References Cited in the file of this patent
UNITED STATES PATENTS

| | | |
|---|---|---|
| 997,098 | Smith | July 4, 1911 |
| 1,273,615 | Jacobs et al. | July 23, 1918 |
| 1,380,187 | Brose | May 31, 1921 |
| 1,562,332 | Jaques | Nov. 17, 1925 |
| 1,993,907 | Williams | Mar. 12, 1935 |
| 2,731,857 | Marino | Jan. 24, 1956 |